United States Patent
Cowman

[11] 3,906,266
[45] Sept. 16, 1975

[54] HIGH INERTIA INSULATING COOLING FAN FOR ELECTRIC MOTOR DEVICE

[75] Inventor: George Wilbur Cowman, Monkton, Md.

[73] Assignee: The Black and Decker Manufacturing Company, Towson, Md.

[22] Filed: Feb. 22, 1974

[21] Appl. No.: 444,700

[52] U.S. Cl. .................. 310/60 R; 310/62; 310/74; 417/423 R
[51] Int. Cl.² ........................................... H02K 9/06
[58] Field of Search ............. 417/423 R; 310/42, 43, 310/62, 74, 60 R; 30/388–391

[56] References Cited
UNITED STATES PATENTS

| | | | |
|---|---|---|---|
| 1,103,237 | 7/1914 | Williams | 415/213 R |
| 1,169,476 | 1/1916 | Gramlich | 416/186 |
| 2,768,583 | 10/1956 | Richard et al. | 417/423 R |
| 3,477,125 | 11/1969 | Schwartz | 310/42 |
| 3,575,524 | 4/1971 | Adajian | 310/62 |
| 3,701,369 | 10/1972 | Gronke et al. | 30/391 |
| 3,829,722 | 8/1974 | Rosenthal et al. | 310/62 |

FOREIGN PATENTS OR APPLICATIONS
1,000,236  2/1952  France .................. 417/423

*Primary Examiner*—C. J. Husar
*Assistant Examiner*—O. T. Sessions
*Attorney, Agent, or Firm*—Edward D. Murphy; Joseph R. Slotnik; Leonard Bloom

[57] ABSTRACT

A high inertia cooling fan for a power device driven by an electric motor is provided. The fan includes a generally circular body of insulating material, e.g., plastic, including a hub to permit the fan to be mounted on the motor shaft, an annular flange extending radially outward from the hub, and a plurality of fan blades at the periphery of the annular flange. A weight of relatively heavy material, e.g., metal, is secured to the annular flange between the hub and the fan blades to increase the inertia of the fan. The body of insulating material allows the fan to serve as an insulation barrier between the electric motor and other electrically conductive components of the power device, and the weight provides increased inertia to allow the fan to act as a flywheel to reduce vibrations in the operation of the device.

1 Claim, No Drawings

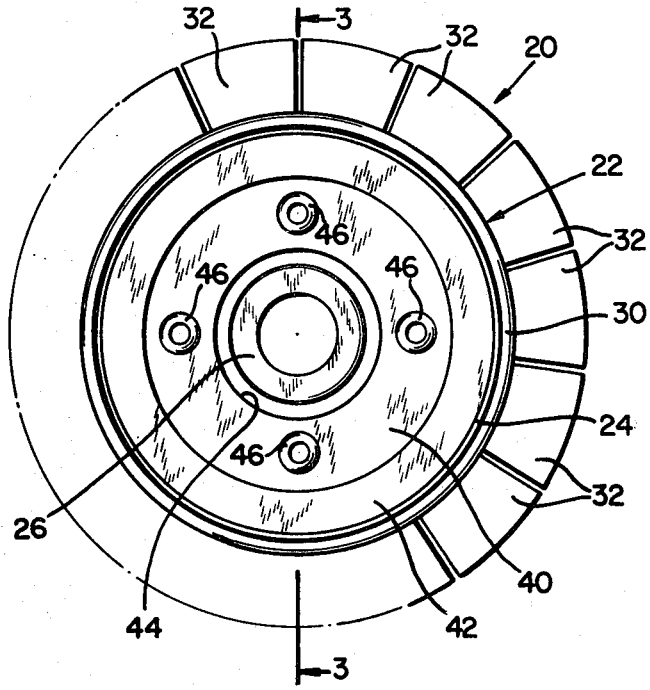

PATENTED SEP 16 1975

3,906,266

HIGH INERTIA INSULATING COOLING FAN FOR ELECTRIC MOTOR DEVICE

The present invention relates to a cooling fan for a power device driven by an electric motor and, more particularly, to a high inertia insulating cooling fan which provides an insulation barrier between the electric circuitry of the motor and other electrically conductive components of the device and which serves as a flywheel to reduce vibrations produced during power operation of the device.

In rotary electric devices, e.g., circular saws, it is extremely important to provide for cooling of the electric motors used to power the device. It has been customary to provide a cooling fan mounted on the motor shaft to draw a flow of cooling air across the electric motor. The prior art has employed metal cooling fans for use in rotary electric power devices. In devices using metal fans, however, it has been necessary to electrically ground the fan normally achieved by grounding the entire unit, to prevent the fan from providing a conductive path between the electric motor circuitry and other electrically conductive components of the device in the event of a mechanical fan failure.

With the advent of double insultated devices which do not employ electrical grounding, it is desirable to use fans of insulating material, e.g., plastic, in place of the prior art metal fans to avoid the need of electrically grounding the unit. An advantage of plastic material is that the fan establishes an insulation barrier between the electric motor and other electrically conductive components of the power device. Thus, in event of a fan failure, the fan could not electrically bridge the motor and other conductive parts.

Plastic material is relatively light in comparison with the metal of the prior art cooling fans. Thus, as a result of substitution of plastic material for the metal previously used, there is a substantial reduction in the inertia of the cooling fans. It has been observed that some rotary electric power devices incorporating a plastic cooling fan have been subject to objectionable vibrations which are non-existent in the case of a metal cooling fan. The reason for the presence of the objectionable vibrations appears to be that the substantial decrease in the inertia of the cooling fan eliminates the flywheel action associated with the relatively heavy metal fan. The vibrations generate undesirable forces which can result in premature failure of component parts of the power device, such as the bearings for the shaft on which the fan is mounted, and gears used in the power train. Thus, in the case of a cooling fan of relatively light, insulating material, it is necessary to compensate for the reduced inertia of the insulating material to avoid the deleterious effects of vibrations on the power device.

It is particularly advantageous to provide a cooling fan which incorporates the insulating characteristics of light weight, non-metal such as plastic without sacrificing the benefits of the flywheel effect of the prior art metal fans. The present invention achieves this objective by providing a cooling fan incorporating a fan body of relatively light, insulating material to serve as an insulation barrier for the electric motor and a weight of relatively heavy material such as metal secured to the fan body to increase its inertia without detracting from its insulating characteristics. The additional weight and resulting increased inertia eliminates the objectionable vibrations which might otherwise occur upon operation of the power device.

The present invention provides a high inertia, electrically insulating cooling fan for a power device driven by an electric motor. In accordance with the invention, the cooling fan comprises a generally circular body including a hub and a plurality of peripheral fan blades and a weight secured to the body between the hub and the fan blades to increase the inertia of the body. Preferably, the fan body is made of insulating material and includes an annular flange extending radially outward from the hub with the fan blades at the periphery of the annular flange. An annular weight of heavy material relative to the insulating material is secured to the annular flange to increase the inertia of the fan body. The annular weight includes a central opening surrounding the hub.

A preferred embodiment of the cooling fan comprises a generally cylindrical body of plastic material including a hub for receiving the shaft of the electric motor, an annular flange extending radially outward from the hub, an annular rim formed at the outer periphery of the annular flange and extending perpendicularly from the annular flange, and a plurality of peripheral fan blades extending radially outward from the annular rim. The annular metal weight is secured to the annular flange within the annular rim to increase the inertia of the body. The annular weight includes an inner annular portion of reduced thickness, an outer annular portion of increased thickness, and a central opening in the inner annular portion of reduced thickness surrounding the hub to permit the motor shaft to extend therethrough.

An alternative embodiment uses a body of plastic material having peripheral fan blades and secured to an annular metal weight, in turn, fixed to the shaft of the electric motor. The insulating fan body is disposed between the motor armature and field and the metal weight, thus serving as an insulating barrier in the event of mechanical fan failure. The metal weight is employed to increase the inertia of the overall fan assembly and thereby reduce vibrations. Also, mounting the fan assembly to the armature shaft through the metal weight, increases its concentricity and stability. A small insulating washer is placed on the armature shaft between the armature windings and fan assembly to satisfy electrical creepage requirements.

The cooling fan of the present invention incorporates the advantageous insulation characteristics of a cooling fan of insulating material and the advantageous inertial properties of a fan of relatively heavy material. The fan body serves as an insulation barrier between the electric motor and other conductive components of the power device. The weight increases the inertia of the fan body and permits the fan to act as a flywheel to minimize the objectionable vibrations.

The accompanying drawing illustrates preferred embodiments of the invention and, together with the description, serves to explain the principles of the invention.

Figure 1:
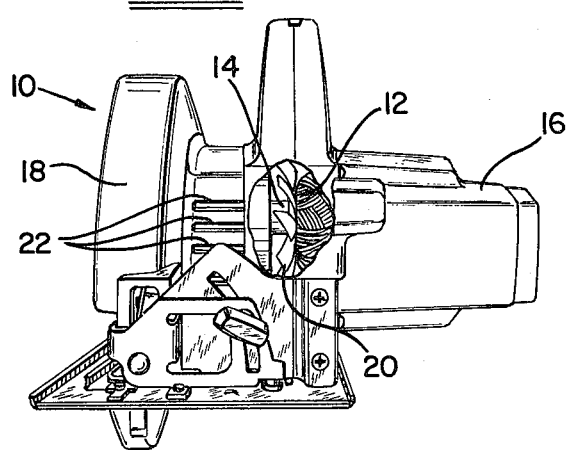
FIG. 1 is a perspective view of a rotary power device, e.g., a circular saw, which is driven by an electric motor and incorporates a high inertia insulating cooling fan constructed according to the principles of the present invention.

Referring to FIG. 1, a rotary power device 10, e.g., a circular saw, includes an electric motor having an output shaft 14 which supports a circular saw blade (not shown). electric motor 12 is mounted within a motor housing 16, and the saw blade is mounted within a blade guard and gear housing 18.

A preferred form of the invention is embodied as a cooling fan 20 constructed according to the principles of the present invention and mounted on motor shaft 14. Upon operation of electric motor 12 to rotate the shaft and saw blade, cooling fan 20 rotates to draw a flow of cooling air through air inlet openings (not shown) in the outer end of motor housing 16, across the windings of electric motor 12, and through a plurality of air outlet openings 22 in blade and gear housing 18. The flow of cooling air is important to maintain the electric motor at a relatively cool temperature to preserve its operating efficiency and long life.

Figure 2:
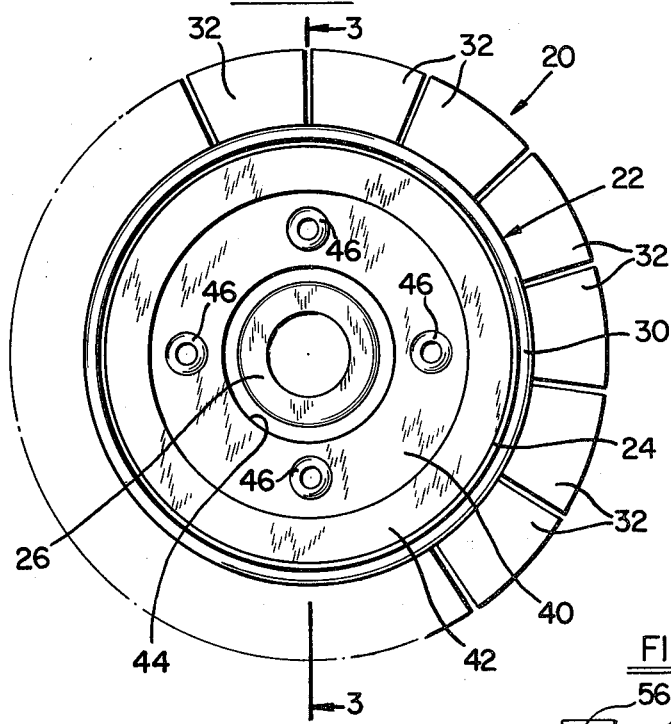
FIG. 2 is a side elevation of the cooling fan.
Figure 3:
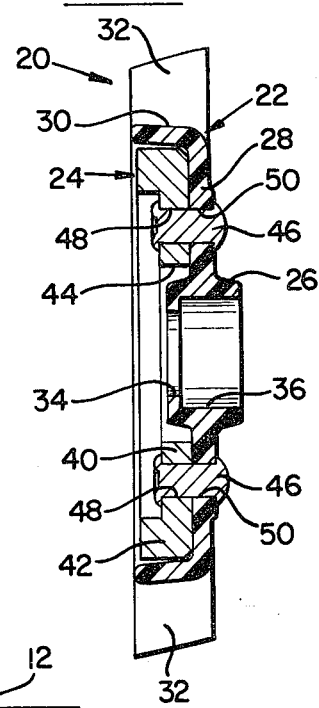
FIG. 3 is a vertical section of the cooling fan taken along lines 3—3 of FIG. 2.

As shown in FIGS. 2 and 3, the cooling fan includes a generally circular body 22 of insulating material and a weight 24 secured to the body to increase its inertia. The fan is made of plastic or any other insulating material which is relatively light in comparison with the material of the weight. The weight is preferably made of metal, e.g., steel or zinc.

Referring to FIG. 3, circular body 22 includes a hub 26 for receiving motor shaft 14, an annular flange 28 extending radially outward from hub 26, and an annular rim 30 formed at the outer periphery of annular flange 28. Annular rim 30 is substantially perpendicular to annular flange 28. A plurality of peripheral fan blades 32 extend radially outward from annular rim 30. The fan blades are oriented on the fan body to draw a flow of cooling air into motor housing 16 (FIG. 1) upon rotation of the fan. As shown in FIG. 3, hub 26 includes an axial opening consisting of a reduced diameter portion 34 and an enlarged diameter portion 36 to facilitate coupling of the fan body to the motor shaft.

Referring to FIG. 2, weight 24 is preferably annular in shape. It is secured to fan body 22 between hub 26 and fan blades 32. As shown in FIG. 3, in the preferred embodiment, annular weight 24 is L-shaped in cross section to provide an inner annular portion 40 of reduced thickness and an outer annular portion 42 of increased thickness. The L-shaped configuration of the annular weight permits the majority of the weight material to be disposed at the largest possible radius from the axis of rotation of the fan. The outer diameter of outer annular portion 42 is equal to or slightly less than the inner diameter of annular rim 30 to allow the annular weight to be received within the annular rim. Annular weight 24 includes a central circular opening 44 which surrounds hub 26 to permit the motor shaft to extend therethrough.

Annular weight 24 is secured to annular flange 28 of the fan body by suitable means such as a plurality of rivets 46. The annular weight includes a plurality of equidistantly spaced openings 48 (FIG. 3) formed in its reduced thickness portion 40 for receiving rivets 46. Similarly, annular flange 28 includes a plurality of corresponding equidistantly spaced openings 50 for receiving the rivets. Alternatively, the annular weight can be secured to the fan body by various techniques, e.g., molding in place, without departing from the principles of the invention.

Although annular weight 24 of the preferred embodiment is illustrated as a single, unitary element of annular shape, it will be obvious to persons skilled in the art that the configuration of the weight can be varied without departing from the principles of this invention. For example, it will be possible to construct annular weight of a plurality of distinct sections individually secured to the fan body.

Annular weight 24 is made of relatively heavy material in comparison with the relatively light insulating material of the fan body. The L-shaped cross section of the preferred embodiment allows distribution of the majority of the weight material at the largest radius from the axis rotation. This weight distribution substantially increases the overall inertia of the cooling fan to allow the fan not only to perform a cooling function but also to serve as a flywheel to reduce vibrations produced in the operation of the power device.

Referring to FIGS. 1 and 3, cooling fan 20 is mounted on motor shaft 14 with its annular flange 28 located adjacent to the electric motor and annular weight 24 located on the opposite side of the flange from the motor. The fan body thus provides an insulation barrier separating the electric motor from the metal weight and other conductive components located on the opposite side of the fan body from the motor. The insulating fan body also helps guard the portion of motor shaft 14 extending through the fan from electrical contact with the motor windings or electrical conduction due to carbon tracking.

Figure 4:
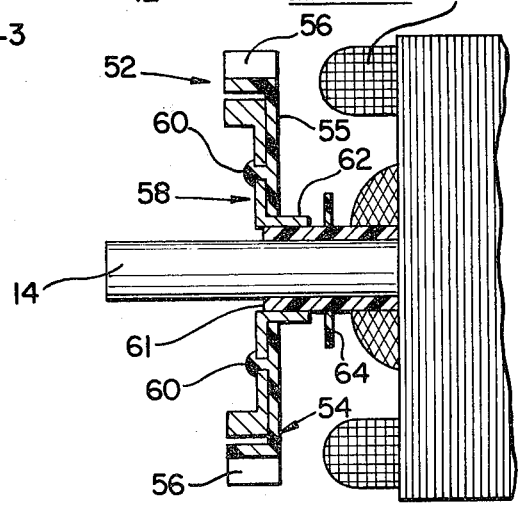
FIG. 4 is a sectional view showing a modified form of cooling fan assembly in place on an electric motor armature shaft.

In the modified form of the invention shown in FIG. 4, a cooling fan assembly 52 includes a circular body 54 of insulating material having an annular flange 55 and plurality of peripheral fan blades 56 formed integral therewith. An annular metal weight 58 is secured to flange 55 by suitable means such as adhesive, rivets, or, as shown, pins 60 formed integral with fan body 54 and ultrasonically or heat staked over weight 58. Like weight 24, weight 58 is disposed on the side of fan body 54 remote from electric motor 12.

Fan assembly 52 is mounted on an insulating sleeve 61 fixed to armature shaft 14 by means of an axial hub or flange 62 formed on weight 58. Alternatively, flange 62 could be sized to mount directly on shaft 14 itself. In any event, since the fan assembly 52 is mounted to the shaft by means of metal member 58, this construction has the advantage of providing a stable and concentric mounting for the fan assembly.

Like the embodiment of FIGS. 1–3 described above, the version of FIG. 4 makes use of the insulating nature of the fan body 54 to prevent electrical bridging between motor 12 and other conductive parts in the event of mechanical fan failure. In addition, an insulating washer 64 is sealingly fitted on the shaft sleeve 61 between motor 12 and metal weight flange 62 to satisfy electrical creepage requirements.

The invention in its broader aspects is not limited to the specific details shown and described, and modifications may be made in the details of the high inertia insulating cooling fan without departing from the principles of the present invention.

What is claimed is:

1. In a portable electric motor-driven device including a housing, an electric motor contained within said housing, a shaft driven by said motor and a cooling fan driven by said motor and serving to provide a flow of cooling air over said motor, said fan comprising a body of insulating material mounted on and extending radially from said shaft, the improvement wherein said fan body comprises a first, generally cup-shaped portion having a central aperture through which said shaft extends, said cup-shaped portion including a generally planar member extending radially from said shaft and said cup-shaped portion also including an axially extending lip formed on the radial extremity of said planar member; said fan body further including a plurality of fan blades extending radially outwardly from said lip; and a metallic inertial member fixed to said fan body within said cup-shaped portion, said inertial member including a first, radially extending part fixed to said planar member of said cup-shaped portion and said inertial member further including an axially extending lip disposed within said lip on said cup-shaped portion to provide a stabilizing inertial weight radially spaced from said shaft, said lip on said cup-shaped member partially enclosing said metallic inertial member to increase the effective tracking distance between said inertial member and electrically live portions of said electric motor.

* * * * *